(12) United States Patent
Tan et al.

(10) Patent No.: US 9,661,339 B2
(45) Date of Patent: May 23, 2017

(54) MULTI-CORE ARCHITECTURE FOR LOW LATENCY VIDEO DECODER

(71) Applicant: INTEL Corporation, Santa Clara, CA (US)

(72) Inventors: Mizhou Tan, Basking Ridge, NJ (US); Bahman Barazesh, Flemington, NJ (US)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 14/174,183

(22) Filed: Feb. 6, 2014

(65) Prior Publication Data
US 2015/0208076 A1    Jul. 23, 2015

Related U.S. Application Data

(60) Provisional application No. 61/929,640, filed on Jan. 21, 2014.

(51) Int. Cl.
*H04N 19/44* (2014.01)
*H04N 19/436* (2014.01)
*H04N 7/12* (2006.01)
*H04N 19/80* (2014.01)

(52) U.S. Cl.
CPC ........... *H04N 19/436* (2014.11); *H04N 19/44* (2014.11); *H04N 19/80* (2014.11)

(58) Field of Classification Search
CPC ........ H04N 19/436; H04N 7/364; H04N 7/50; H04N 7/26808; H04N 5/145; H04N 7/26739
See application file for complete search history.

(56) References Cited

U.S. PATENT DOCUMENTS

| | | | |
|---|---|---|---|
| 6,473,087 B1 * | 10/2002 | Tsang | G06F 15/8007 345/504 |
| 6,931,506 B2 * | 8/2005 | Audrain | G06F 15/786 711/167 |
| 7,660,352 B2 | 2/2010 | Yamane et al. | 375/240.12 |
| 7,983,342 B2 | 7/2011 | Saha et al. | 375/240.23 |
| 8,213,518 B1 | 7/2012 | Wang et al. | 375/240.25 |

(Continued)

OTHER PUBLICATIONS

Wiegand, Thomas, et al., "Overview of the H.264/AVC Video Coding Standard", IEEE Transactions on Circuits and Systems for Video Technology, vol. 13, No. 7, Jul. 2003, pp. 560-576.

(Continued)

*Primary Examiner* — Sath V Perungavoor
*Assistant Examiner* — Howard D Brown, Jr.
(74) *Attorney, Agent, or Firm* — Green, Howard & Mughal LLP (57) ABSTRACT

An apparatus having first, second and third processors of a multi-core processor is disclosed. The first processor is configured to perform one or more first operations in a decoding of a plurality of macroblocks of video in a bitstream. The second processor (i) operates as a slave to the first processor and (ii) is configured to perform one or more second operations in the decoding of the macroblocks. The third processor (i) operates as a slave to the second processor and (ii) is configured to perform one or more third operations in the decoding of the macroblocks.

20 Claims, 8 Drawing Sheets

(56) References Cited

U.S. PATENT DOCUMENTS

| | | | |
|---|---|---|---|
| 2003/0128709 A1* | 7/2003 | Venkitakrishnan | H04Q 3/5455 370/400 |
| 2003/0185305 A1* | 10/2003 | MacInnis | G06F 9/3861 375/240.25 |
| 2008/0235493 A1* | 9/2008 | Fortier | G06F 9/3867 712/31 |
| 2009/0307464 A1* | 12/2009 | Steinberg | G06F 9/505 712/31 |
| 2010/0220215 A1* | 9/2010 | Rubinstein | G06F 15/8015 348/231.99 |
| 2012/0177119 A1* | 7/2012 | Dwarakapuram | H04N 19/43 375/240.16 |
| 2013/0024589 A1* | 1/2013 | Yamauchi | G06F 9/4812 710/263 |
| 2013/0113996 A1* | 5/2013 | Zhu | H04N 5/45 348/565 |
| 2013/0202051 A1 | 8/2013 | Zhou | 375/240.26 |
| 2013/0279877 A1 | 10/2013 | Boak | 386/231 |

OTHER PUBLICATIONS

Sullivan, Gary J., et al., "Overview of the High Efficiency Video Coding (HEVC) Standard", IEEE Transactions on Circuits and Systems for Video Technology, vol. 22, No. 12, Dec. 2012, pp. 1649-1668.

Bilavarn, S., et al., "Embedded Multicore Implementation of a H.264 Decoder with Power Management Considerations", 11th Euromicro Conference on Digital System Design Architectures, Methods and Tools, 2008 IEEE, pp. 124-130.

\* cited by examiner

MULTI-CORE ARCHITECTURE FOR LOW LATENCY VIDEO DECODER

This application relates to U.S. Provisional Application No. 61/929,640, filed Jan. 21, 2014, which is hereby incorporated by reference in its entirety.

FIELD OF THE INVENTION

The invention relates to video decoding generally and, more particularly, to a method and/or apparatus for implementing a multi-core architecture for a low latency video decoder.

BACKGROUND

Video codecs, such as the H.264/advanced video coding (i.e., AVC) for generic audiovisual services standard and the H.265/high efficiency video coding (i.e., HEVC) standard, are intended to achieve high quality video at low bit-rates. The H.264/advanced video coding standard has been effectively employed on a variety of systems such as video broadcasting and video conferencing. Due to the increasing calls for better video quality, high definition video (i.e., 1080 progressive frames at 30 frames per second), large resolutions (i.e., 4,000 pixel resolution) and higher frame frames (i.e., 60 frames per second), more processing power is being demanded. Furthermore, more advanced coders (i.e., H.265/high efficiency video coding) use more sophisticated codecs techniques that consume more processing power and hence larger numbers of processor cores for real-time applications. Fortunately, the recent progress in processor architecture allows for more parallelization of computer programs.

SUMMARY

The invention concerns an apparatus having first, second and third processors of a multi-core processor. The first processor is configured to perform one or more first operations in a decoding of a plurality of macroblocks of video in a bitstream. The second processor (i) operates as a slave to the first processor and (ii) is configured to perform one or more second operations in the decoding of the macroblocks. The third processor (i) operates as a slave to the second processor and (ii) is configured to perform one or more third operations in the decoding of the macroblocks.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a multi-core architecture for a low latency video decoder that may (i) partition decoder slice operations onto multiple processors, (ii) implement a master-slave hierarchy, (iii) operate each processor at a different decoding level, (iv) operate each processor in parallel, (v) transfer macroblocks sequentially through the processors, (vi) achieve a latency of less than a picture frame time and/or (vii) be implemented as one or more integrated circuits.

Embodiments of the present invention provide approaches to enable parallel multi-core processing to achieve real-time performance. An advanced multi-core decoder design is a nontrivial task due to the large amount of data processing and complicated inter-dependencies between the cores. The multi-core processing approach targets, but is not limited to, low latency applications such as video conferencing.

The approach partitions decoder slice operations onto multiple processors with a hierarchy master-slave structure. Each processor works at a different decoding level and a given processor acts as a master of another processor working at a lower level. To achieve parallelization, each processor performs a set of different slice decoding operations simultaneously, but for a different set of a macroblock group. Since the partition is done for each slice processing, the decoding achieves a low latency less than a single picture frame time (or period).

The architecture can accommodate pictures (e.g., fields or frames) with a single slice. Furthermore, the architecture has a moderate processing overhead since all macroblock level processing is handled sequentially based on an original encoding order. The approach is suitable for a baseline profile, main-profile and high-profile H.264 decoding, which could have bidirectional encoded pictures and interlaced mode encoded pictures.

Figure 1:
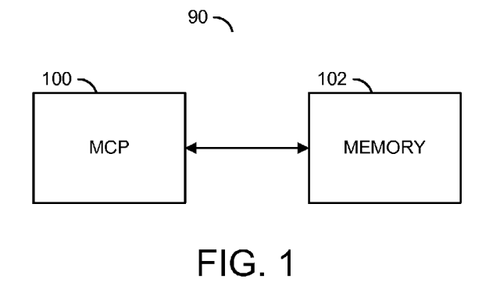
FIG. 1 is a block diagram of a system.

Referring to FIG. 1, a block diagram of a system 90 is shown. The system (or apparatus, or device, or integrated circuit) 90 is shown implementing a multi-core communication processor system. The apparatus 90 generally comprises a block (or circuit) 100 and a block (or circuit) 102. The circuits 100 to 102 may represent modules and/or blocks that may be implemented as hardware, software, a combination of hardware and software, or other implementations.

The circuit 100 is shown implementing a multi-core processor circuit. The circuit 100 is generally operational to execute software programs, middleware and/or firmware stored in the circuit 102. Execution of the software/middleware/firmware (or instructions) provides video decoding capabilities, such as the H.264/advanced video coding (e.g., AVC) capabilities and the H.265/high efficiency video coding capabilities. The H.264/advanced video coding standard and the H.265/high efficiency video coding standard are published by the International Telecommunication Union Telecommunication Standardization Sector, Geneva, Switzerland. Other video standards may be implemented to meet the criteria of a particular application. In some embodiments, the circuit 100 may be implemented (or fabricated) as one or more chips (or die or integrated circuits).

The circuit 102 is shown implementing a memory circuit. The circuit is generally operational to (i) store the instructions and data consumed by the circuit 100 and (ii) store the data created by the circuit 100. In some embodiments, the circuit 102 implements one or more double data rate type-three synchronous dynamic random access memories. Other memory technologies may be implemented to meet the criteria of a particular application. In some embodiments, the circuit 102 is implemented (or fabricated) as one or more chips (or die or integrated circuits) separate from the circuit 100. In other embodiments, the circuit 102 is implemented in (on) the same chips as the circuit 100.

Figure 2:
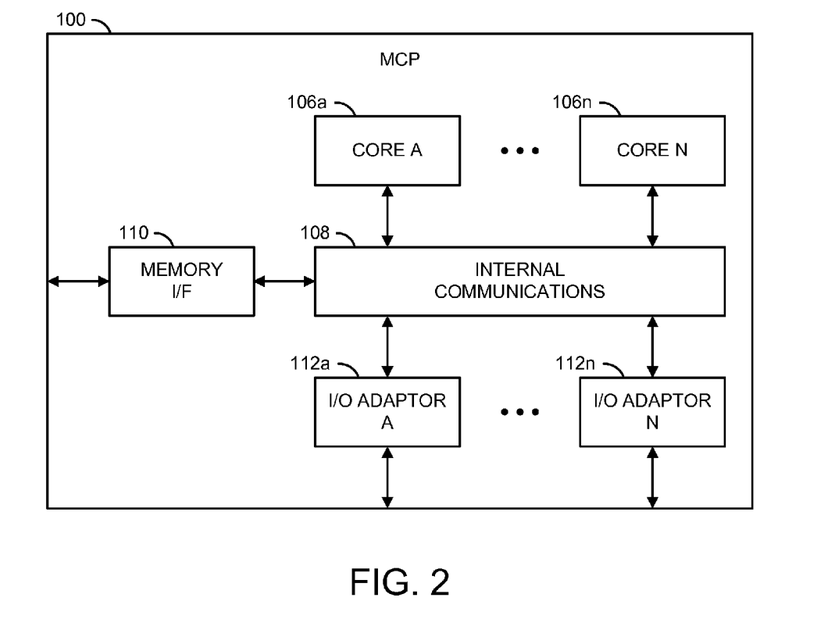
FIG. 2 is a diagram of a multi-core circuit of the system.

Referring to FIG. 2, a block diagram of an example implementation of the circuit 100 is shown. The circuit 100 generally comprises multiple blocks (or circuits) 106a-106n, a block (or circuit) 108, one or more blocks (or circuits) 110 and one or more blocks (or circuits) 112a-112n. The circuits 106a to 112n may represent modules and/or blocks that may be implemented as hardware, software, a combination of hardware and software, or other implementations.

Each circuit 106a-106n is shown implementing a central processor unit (or processor) core. The circuits 106a-106n are generally operational to execute the instructions received from the circuit 102 to perform the various decoding functions of the apparatus 90.

The circuit 108 is shown implementing an internal communication circuit. The circuit 108 is generally operational to provide communications among the circuits 106a-106n, 110 and 112a-112n. The circuit 108 includes, but is not limited to, caching capabilities, security processing, scheduler operations and timer management operations.

The circuit 110 is shown implementing a memory interface circuit. The circuit 110 is generally operational to exchange data and instructions between the circuit 100 and the circuit 102. The circuit 110 communicates directly with the circuit 108.

Each circuit 112a-112n is shown implementing an input/output (e.g., I/O) adaptor circuit. The circuits 112a-112n are operational to exchange data between the circuit 100 and other external circuitry through a variety of input/output capabilities. The circuits 112a-112n include, but are not limited to, a serialization/deserialization (e.g., SERDES) interface, an Ethernet interface, a universal serial bus-2 (e.g., USB2) interface, a dual universal asynchronous receiver/transmitter (e.g., DUART) interface, an inter-integrated circuit (e.g., I2C) interface, a general purpose input/output (e.g., GPIO) interface, a serial rapid input/output (e.g., sRIO) interface and/or a peripheral component interconnect express) (e.g., PCIe) interface. Other input/output adaptor circuits may be implemented to meet the criteria of a particular application.

Figure 3:
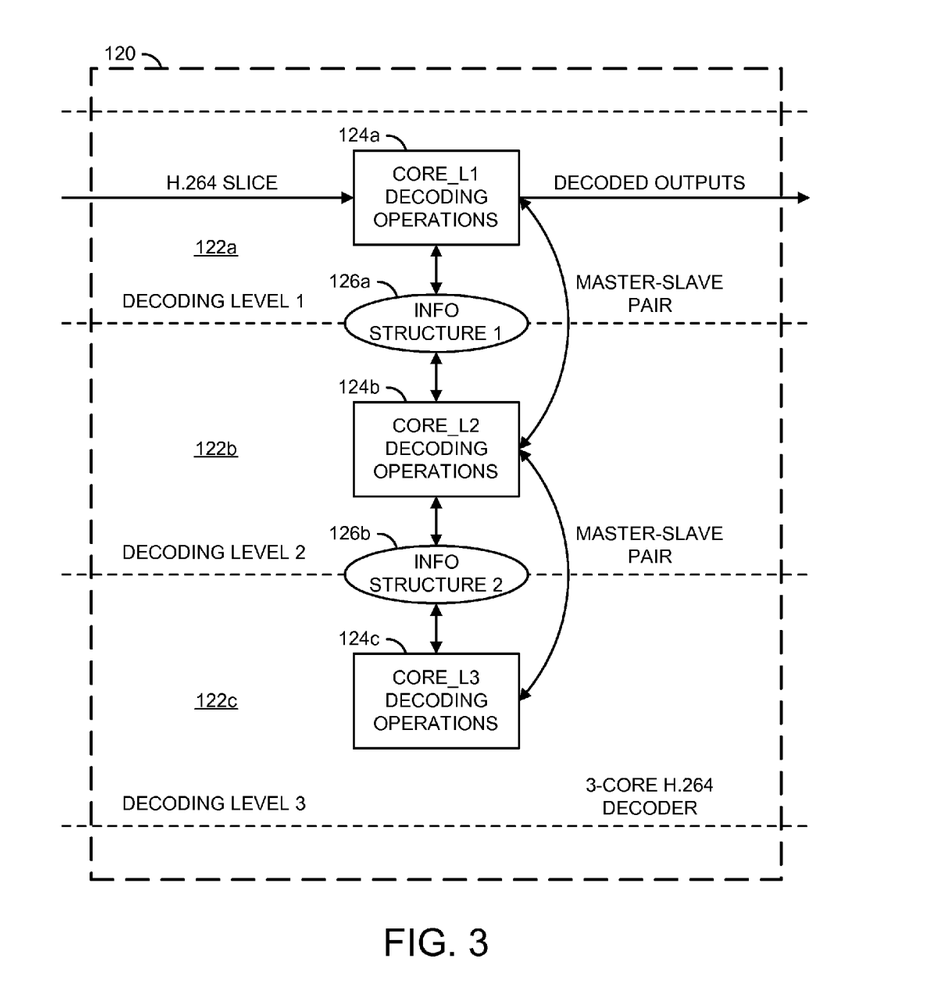
FIG. 3 is a diagram of a top-level architecture of a multi-core design in accordance with an embodiment of the invention.

Referring to FIG. 3, a diagram of a top-level architecture 120 of a multi-core design is shown in accordance with an embodiment of the invention. The architecture 120 generally comprises multiple decoding levels 122a-122c, multiple sets of decoding operations (or functions) 124a-124c and multiple information structures (or exchanges) 126a-126b. A signal (e.g., H.264 SLICE) is shown being received by the operation 124a. The signal H.264 SLICE is a video bitstream carrying a sequence of pictures. Each picture generally comprises one or more slices. A signal (e.g., DECODED OUTPUTS) is generated and presented by the operation 124a. The signal DECODED OUTPUTS generally carries the decoded video.

The decoding processing is partitioned into multiple (e.g., three) different operations 124a-124c at the multiple levels 122a-122c. Core_L1 decoding operations 124a are implemented in a circuit (e.g., core_L1 is the circuit 106a) at a highest level (e.g., level 122a). Core_L3 decoding operations 124c are implemented in a circuit (e.g., core_L3 is the circuit 106c) at a lowest level (e.g., level 122c). Core_L2 decoding operations 124b are implemented in a circuit (e.g., core_L2 is the circuit 106b) in a middle level (e.g., level 122b).

The core_L1 and the core_L2 form a master-slave relationship through an information structure 126a, with the core_L1 as the master. Therefore, the core_L1 assigns some decoding work to the core_L2. The core_L1 and core_L2 communicate with each other through the information structure 126a. Similarly, the core_L2 and the core_L3 form another master-slave relationship through the information structure 126b, with the core_L2 as the master. The core_L2 assigns some decoding work to the core_L3. The core_L2 and core_L3 communicate with each other through the information structure 126b. Parallelization is achieved by performing the different decoding operations (e.g., operations 124a-124c) in different circuits 106a-106n (e.g., core_L1-core_L3) for different groups of macroblocks.

Figure 4:
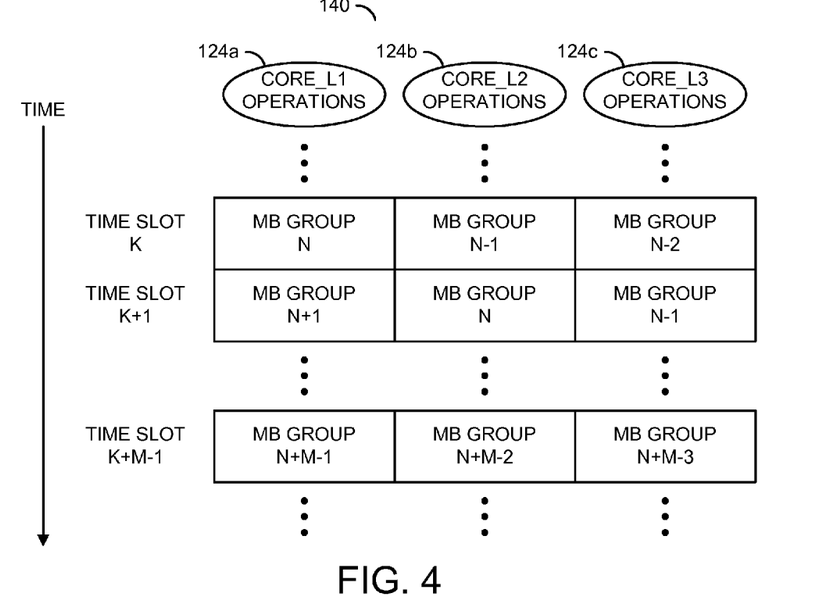
FIG. 4 is a diagram of a parallelization technique.

Referring to FIG. 4, a diagram of a parallelization technique 140 is shown. The total decoding operations 124a-124c are split among the multiple (e.g., three) circuits 106a-106n. While the core_L1 is working (e.g., operations 124a) on a macroblock group N during a time slot K, the core_L2 is working (e.g., operations 124b) on a macroblock group N−1. The macroblock group N−1 has previously completed the decoding operations 124a. The core_L3 is working (e.g., operations 124c) on a macroblock group N−2 during the time slot K. The macroblock group N−2 has previously completed the decoding operations 124a and the decoding operations 124b.

In the time slot K+1, the core_L1 performs the operations 124a on a macroblock group N+1. The core_L2 receives the macroblock group N and begins the operations 124b. The core_L3 receives the macroblock group N−1 and performs the operations 124c. The shifting of each group of macroblocks from core to core at the start of each time slot continues until all of the sets of macroblocks have been decoded. Although different types of decoding operations are performed simultaneously, for each specific decoding operation, such as inter-prediction, the overall decoding is generally performed sequentially. Therefore, the technique 140 avoids complicated inter-dependencies of the processed data.

Figure 5:
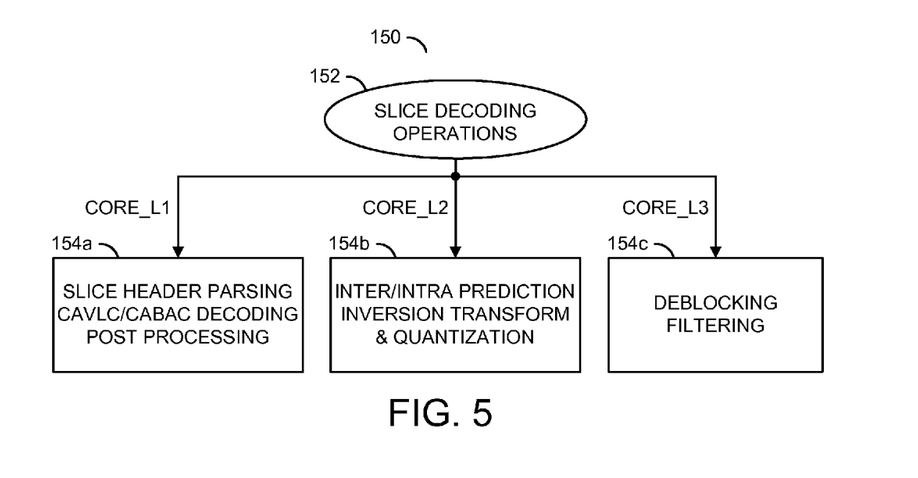
FIG. 5 is a diagram of a slice decode partitioning.

Referring to FIG. 5, a diagram of an example slice decode partitioning 150 is shown. To achieve a good load balancing, the decoding process operations should be evenly divided among the circuits 106a-106n. During the decoding, slice decoding operations 152 for a single slice generally involve several major operations that include, but are not limited to, slice header parsing, entropy decoding (e.g., context adaptive variable length code decoding or context adaptive binary arithmetic code decoding), inter/intra prediction, inverse transformation, inverse quantization, deblock filtering and picture post processing, such as error concealment.

The decoding load usually depends on the video content, the encoding methods and the optimization performed for the targeted processor. From an average point of view based on the function profiling of an H.264 decoder, the context adaptive variable length code decoding/context adaptive binary arithmetic code decoding operations 154a occupies about 25%-30% of the processing load. The deblocking filtering operations 154c occupies about another 25%-30% of the processing load. The remaining decoding operations 154b are generally partitioned into a separate set. In various embodiments, different partitioning may allocate functionality differently among the circuits 106a-106n where better load balancing among the multiple processors can be achieved.

Figure 6:
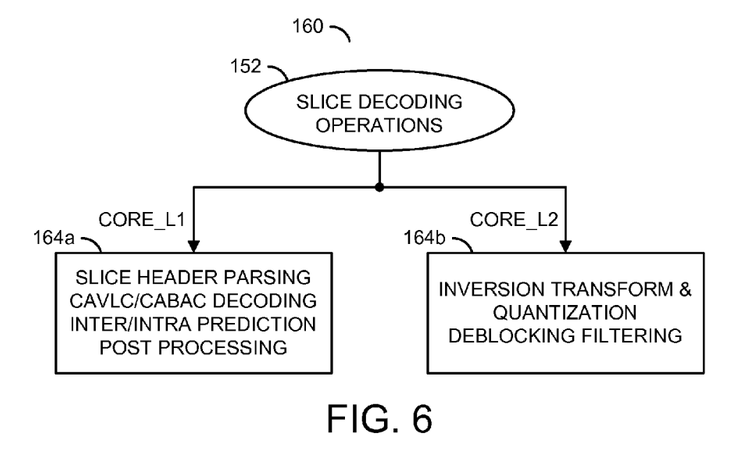
FIG. 6 is a diagram of another slice decode partitioning.

Referring to FIG. 6, a diagram of another example slice decode partitioning 160 is shown. In the case of performing the decoding on a few (e.g., two) processors, the slice decoding operations 150 are allocated in sets 164a-164b among the few processors (e.g., core_L1 and core_L2). Other partitions and allocations for different numbers of processor may be implemented to meet the criteria of a particular application.

The processing load for the decoder generally depends on a complexity of the input compressed video sequences. A fixed partition of the decoder operations might not be able to achieve consistently good load balancing performance for different sequences. Therefore, the load balancing on multiple processors may be further improved using one or more of several techniques. The techniques generally include, but are not limited to, dynamic operation partitioning, dynamic macroblock group sizing, and dynamic allocation of non-decoding related operations.

Figure 7:
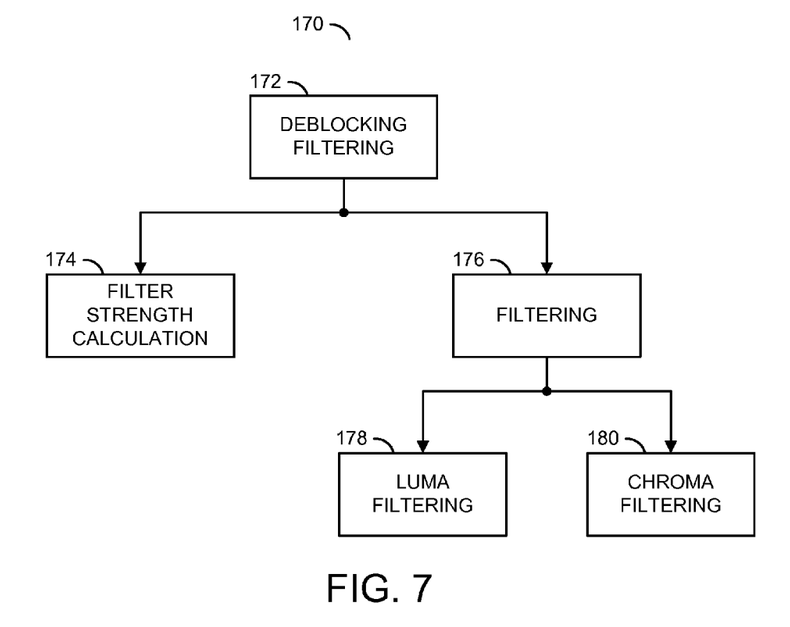
FIG. 7 is a diagram of dynamic partitioning.

Referring to FIG. 7, a diagram of an example dynamic partitioning 170 of a deblocking filter operation 172 is shown. The deblocking filter operation 172 generally comprises a step (or state) 174 and a step (or state) 176. The step 176 generally comprises a step (or state) 178 and a step (or state) 180. The steps 172-180 may represent modules and/or blocks that may be implemented as hardware, software, a combination of hardware and software, or other implementations.

Different slice types (e.g., intra (I), bidirectional (B) and predictive (P)) are encoded differently. Therefore, the computational complexity of a same decoding operation is usually different for the different slice types. By having an understanding of the statistics, the partitioning can be dynamically changed based on the slice type. For example, I-slice deblock filtering 172 usually has a much higher computational complexity than P/B-slice deblock filtering 172. In such a case, a further partitioning of the deblocking filtering operation onto multiple cores is implemented.

As shown in FIG. 7, deblock filtering operation 172 can be partitioned into several (e.g., two) operations 174 and 176. The operation 174 is shown implementing a filter strength calculation operation. The operation 176 is shown implementing a filtering operation. For more complex situations, the operation 176 may be partitioned into a luminance filtering operation 178 and a chrominance filtering operation 180. In situations where the filter loading is low, the deblock filtering operation 172 may be performed by a single circuit 106a-106n. For moderate filter loading situations, the deblock filtering may be partitioned into the two operations 174 and 176 executing on two of the circuits 106a-106n. For high filter loading situations, the deblock filtering is partitioned into the three operations 174, 178 and 180 in three of the circuits 106a-106n. The more detailed partitions allow for more flexibility in load balancing control.

The dynamic partitioning can be further extended when the decoder has a capability of complexity prediction. A "waiting time indicator" is implemented in the decoder for each circuit 106a-106n to estimate the time used to wait for the other circuits 106a-106n during each slice processing. Usually, neighboring slices could have a high correlation in processing loads so that the indicator can be used to predict the next slice operation so that selection of partitioning can be applied on a slice-by-slice basis.

The dynamic selection of the number of macroblocks in a macroblock group generally improves load balancing. An approach similar to the "waiting time indicator" may also be implemented to control the macroblock group sizes. In various embodiments, each macroblock group could include a single macroblock to have a low waiting time. In such cases, once the core_L1 completes the operations 124a for the macroblock, the core_L2 can immediately start the operations 124b for the same macroblock. However, some intermediate information is usually transferred from the core_L1 to the core_L2 before starting the operations 124b. The transfer contributes to overhead, such as setting-up a direct memory access operation or memory copy overhead.

In embodiments implementing a pair of cores arranged as a master and a slave, if the load on the master is higher than the slave, combining a larger number of macroblocks in each group can save the overhead of the data transfers and cache operations on the master. Furthermore, achieving cache coherency with a larger number of macroblocks in a group can be more efficient since fewer operations are implemented to maintain the cache coherency. However, a smaller number of macroblocks in a group permits the slave to start as soon as possible. Since the loads on the master and the slave are dependent on the processed data, the macroblock group size can be changed dynamically in response to the waiting time indicator.

Figure 8:
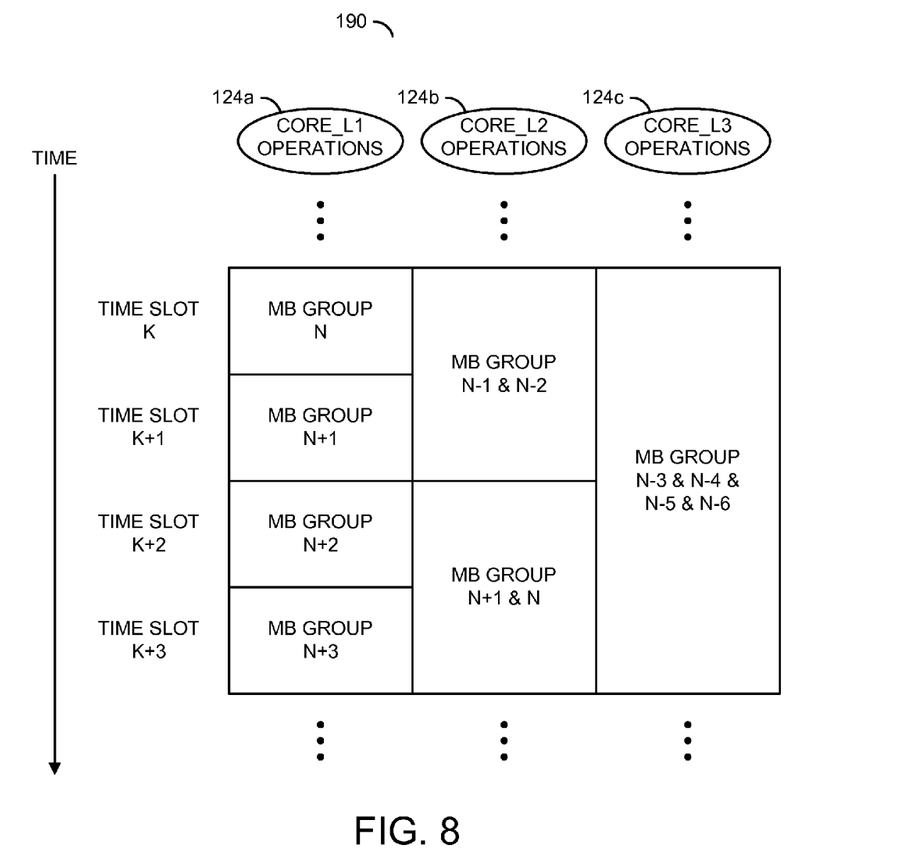
FIG. 8 is a diagram of parallelization with different macroblock group sizes.

Referring to FIG. 8, a diagram of an example parallelization 190 with different macroblock group sizes is shown. In various embodiments, a different macroblock group size can be adopted. The parallelization 190 generally illustrates different macroblock group sizes being processed in parallel by the different cores. In the example, the core_L1 performs the operations 124a on macroblock groups having a given number of macroblocks, with a different group in each time slot. The core_L2 performs the operations 124b on larger macroblock groups over more time slots. For example, the core_L2 is shown operating on a combined macroblock group N−1 and N−2 together during the time slots K and K+1. The core_L3 performs the operations 124c on even larger macroblock groups during more time slots. For example, the core_L3 is shown operating on a combined macroblock group N−3, N−4, N−5 and N−6 during the time slots K, K+1, K+2 and K+3. Other combinations of macroblock groups and utilizations of the time slots may be implemented to meet the criteria of a particular application.

In many applications, besides the normal decoding operations, some additional functionality (e.g., non-decoding related operations) is implemented. Examples of the additional functionality include, but are not limited to, output picture resolution resizing and color conversion. The additional operations are applied to achieve a better load balancing among multiple circuits 106a-106n. As an example, the resizing operation of a single output picture can be partitioned into multiple independent tasks, each task for a number of pixel lines. When each task is ready to be performed, each circuit 106a-106n executes a task, depending on a load indicator (e.g., the waiting time indicator). In various embodiments, the additional operations are allocated in the multi-core architecture with an improved load balancing.

Figure 9:
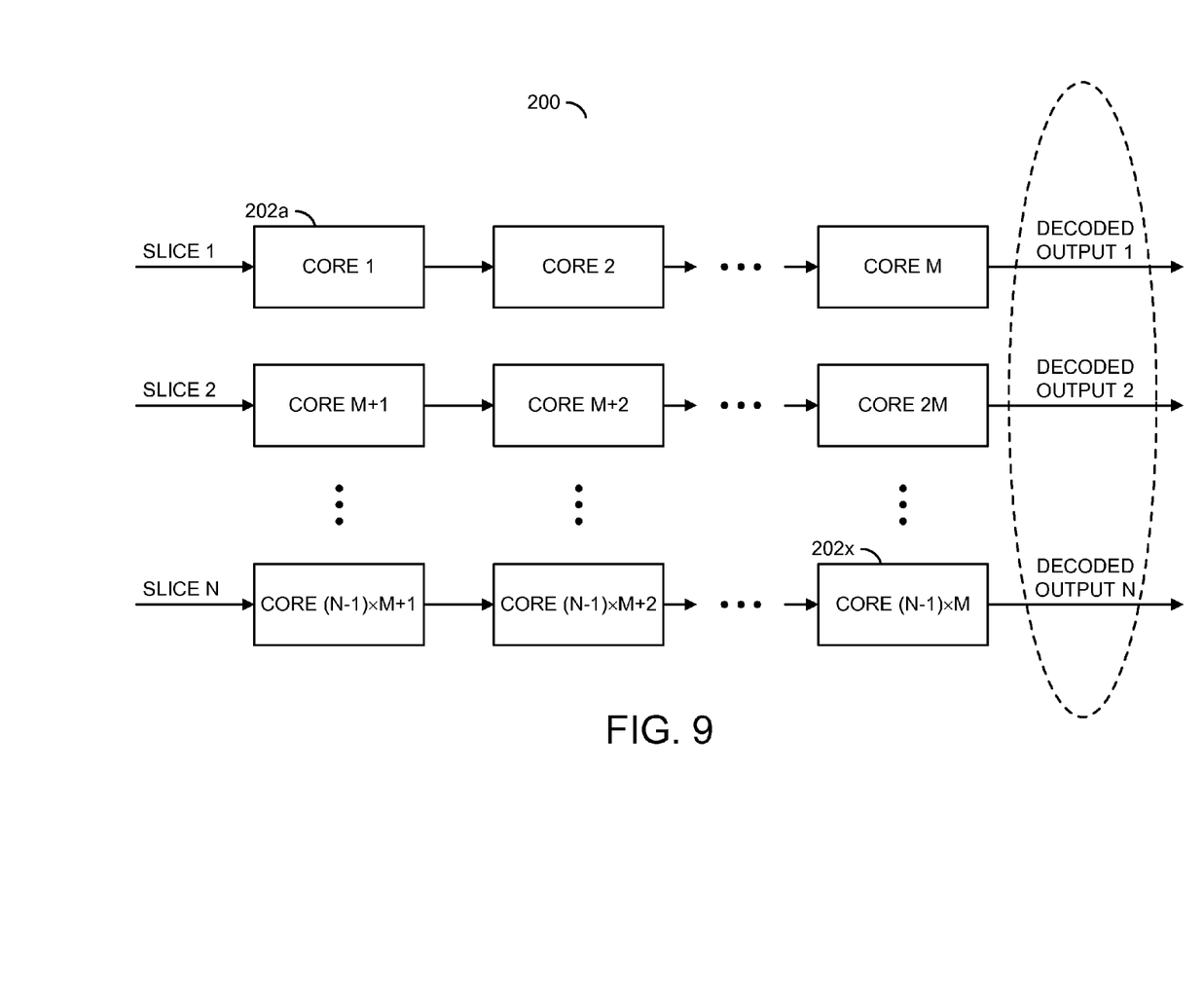
FIG. 9 is a block diagram of a hybrid architecture.

Referring to FIG. 9, a block diagram of an example hybrid architecture 200 is shown. The hybrid architecture 200 is applicable in designs where the circuit 100 has one or more additional cores beyond the three cores shown in the architecture 120. The decode operations are generally allocated to multiple cores 202a-202x. Sets of the cores 202a-202x are associated with each slice of multiple slices (e.g., SLICE 1 to SLICE N) received by the circuit 100. When more than three cores are available in the circuit 100 for the decode processing and the pictures contain multiple slices, the hybrid multi-core decoding architecture 200 is implemented to incorporate slice parallelization. In the architecture 200, a level parameter "M" is 2 or 3 and a depth parameter "N" denotes a depth of the parallelization. The depth N of the parallelization is established to satisfy the latency criteria.

A slice (e.g., SLICE 1) is received by an initial core (e.g., core 1) and processed by the core 1 to the core M per the architecture 120 (e.g., FIG. 3). Another slice (e.g., SLICE 2) is received by another core (e.g., core M+1) and processed by the core M+1 to the core 2M per the architecture 120. Similar allocations of the cores 2M+1 to core (N−1)×M are implemented to decode the other slices (e.g., SLICE 3 to SLICE N).

The architecture 120 was implemented on a multi-core processor. Each core was run at close to a maximum limit in a given technology for good power consumption. Each processor was operated at a maximum frequency (e.g., Fmax megahertz). Both the 2-core and the 3-core schemes were implemented for a high definition (e.g., 1080 progressive resolution picture) decoder with an internal 1080 lines progressive to 720 lines progressive resizing. Based on the test results, for a typical video conference sequence with a bit rate of 4 megabits per second, the 2-core implementation achieves an average of more than 24 frames per second output and the 3-core implementation achieves an average of more than 32 frames per second output, compared with an average performance of about 17 frames per second when employing a single-core.

Figure 10:
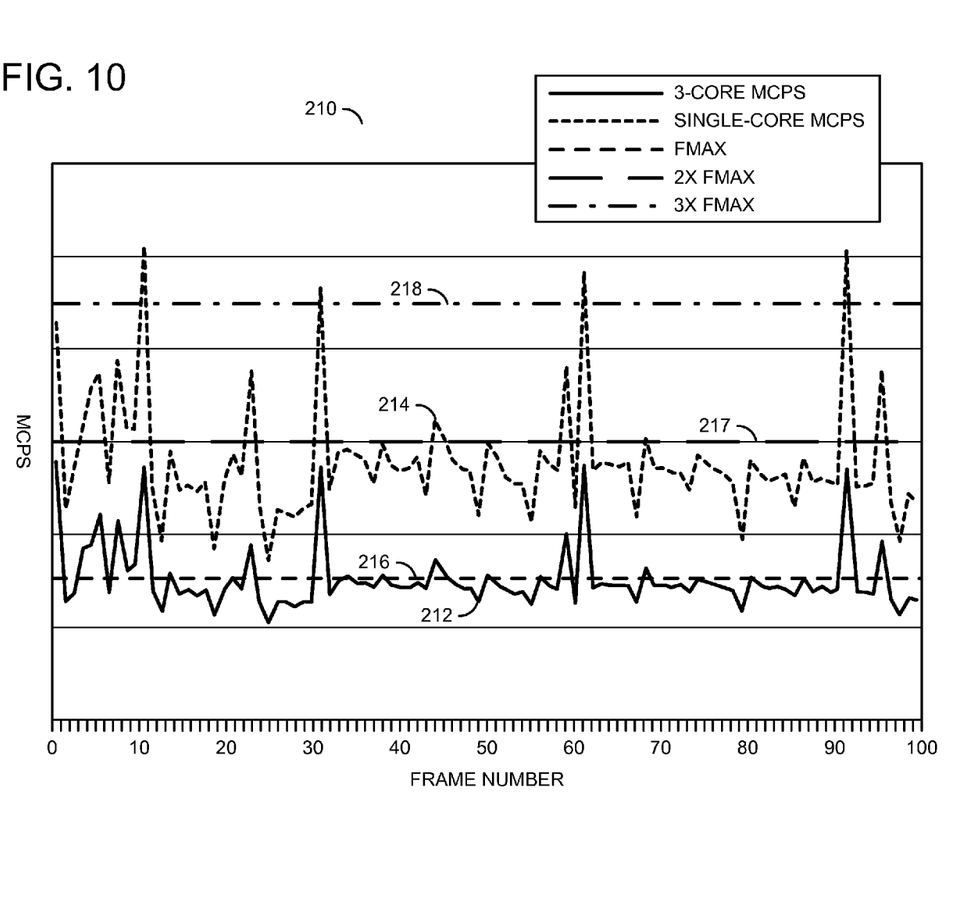
FIG. 10 is a graph of a frame-by-frame comparison.

Referring to FIG. 10, a graph of a frame-by-frame million cycles per second (e.g., MCPS) comparison 210 to achieve a frame rate of 30 frames per second is shown. The utilized cycles per second should not exceed Fmax to achieve the real-time performance. A curve 212 illustrates a performance of a 3-core decoder. A curve 214 illustrates the performance of a 1-core decoder. A line 216 denotes the maximum core frequence Fmax. A line 217 denotes twice the maximum core frequency (e.g., 2×Fmax). A line 218 denotes three times the maximum core frequency (e.g., 3×Fmax). I-frames are in frame positions 1, 31, 61 and 91. In the 3-core implementation, the performance of the core_L1 was the slowest among the three cores and, therefore, used to determine the overall 3-core performance in the comparison. The simulation parameters and the partitions on 3 cores are summarized in Table 1 as follows:

TABLE 1

| | |
|---|---|
| Test Sequence Name | Television Show (typical video conference sequence) |
| Test Sequence Info | Baseline Profile 4.0, 4 Mbits per second |
| Picture Resolution | 1920 × 1088 (High Definition) |
| Picture Frame Rate | 30 frames per second |
| MB Group Size (Number of MBs) | Core_L1: 40 Core_L2: 40 Core_L3: 120 |
| Core_L1 Partition | Slice header parsing, CAVLC/CABAC decoding, post processing |
| Core_L2 Partition | Inter/Intra prediction Inverse transform and quantization Deblocking Strength Calculation |
| Core_L3 Partition | Deblock Filtering for both Luma and Chroma resizing |
| Dynamic Scheme Used | None |

As illustrated, to achieve 30 frames per second in the single-core implementation, the performance generally exceeds the processor capability (e.g., Fmax). With the 3-core scheme per the architecture 120, the processing load is spread across the three cores so that achieving 30 frames per second becomes feasible. The average million cycles per second utilization shown in FIG. 10 for most frames is close to Fmax. The million cycles per second utilization peaks can be further reduced with one or more of the load balancing techniques.

From the comparison 210, the peak million cycles per second utilization in the 3-core implementation mainly happens for the I-frames (e.g., frame number 1, number 31, number 61 and number 91). By using the dynamic partition of the deblocking filtering based on the frame type, the peak millions of cycles per second is lowered.

Figure 11:
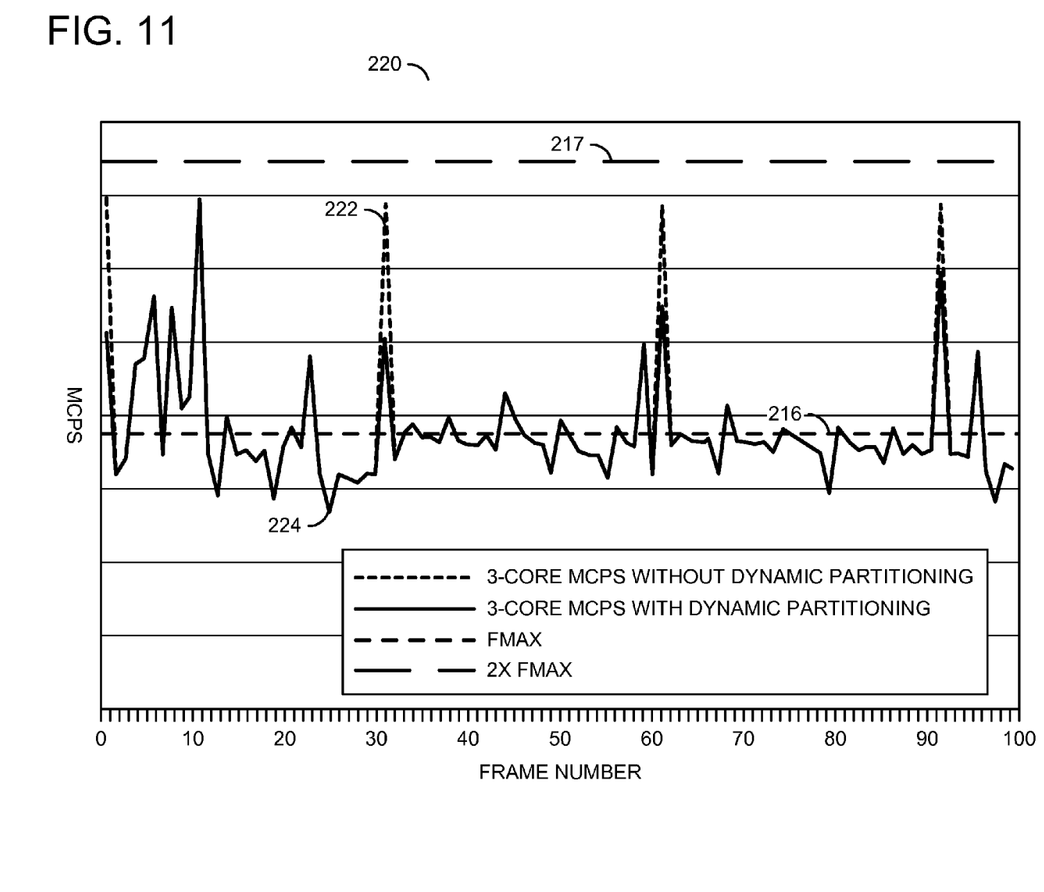
FIG. 11 is a graph of another frame-by-frame comparison.

Referring to FIG. 11, a graph of a frame-by-frame million cycles per second comparison 220 is shown. A curve 222 illustrates a performance of a 3-core decoder without dynamic partitioning. A curve 224 illustrates the performance of a 3-core decoder with dynamic partitioning. The line 216 denotes the maximum core frequence Fmax. The line 217 denotes twice the maximum core frequency. The average million cycles per second utilization shown in FIG. 11 for most frames is close to Fmax using the dynamic partitioning. I-frames are in frame positions 1, 31, 61 and 91. The curve 224 illustrates that the dynamic partitioning helps to balance the load for the I-frames.

Embodiments of the invention generally provide a multi-core architecture for a high definition video (e.g., H.264/ advanced video coding and H.265/high efficiency video coding) decoder which achieves low decoding latency with a moderate multi-core processing overhead. Several load balancing techniques may be implemented for further improving the performance. The test results on a multi-core digital signal processor platform have proved the effectiveness of the architecture.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A decoder apparatus comprising:
a first processor of a multi-core processor configured to perform one or more first decoding operations in a decoding of a plurality of macroblocks of video in a bitstream;
a second processor of said multi-core processor operating as a slave to said first processor and configured to perform one or more second decoding operations in said decoding of said macroblocks; and
a third processor of said multi-core processor operating as a slave to said second processor and configured to perform one or more third decoding operations in said decoding of said macroblocks, wherein the first, second, and third processors are configured to operate in parallel during a first time slot on a first macroblock, a second macroblock, and a third macroblock of said macroblocks, respectively, wherein the second macroblock was previously operated on by the first processor in a second time slot prior to the first time slot, and the third macroblock was previously operated on by the first processor in a third time slot prior to the second time slot and by the second processor in the second time slot.

2. The decoder apparatus according to claim 1, wherein the first decoding operations comprise slice header parsing and entropy decoding, the second decoding operations comprise one of inter prediction or intra prediction, inverse quantization, and inverse transformation, and the third decoding operations comprise deblock filtering.

3. The decoder apparatus according to claim 1, wherein the second time slot is immediately prior to the first time slot and the third time slot is immediately prior to the second time slot.

4. The decoder apparatus according to claim 1,
wherein the plurality of macroblocks correspond to a first slice of the video, wherein the first slice is a P- or B-slice, wherein, in response to the first slice being a P- or B-slice, the first processor is configured to perform slice header parsing and entropy decoding for the first slice, the second processor is configured to perform inter prediction or intra prediction, inverse quantization, and inverse transformation for the first slice, and the third processor is configured to perform deblock filter strength calculations and deblock filtering for the first slice,
wherein the bitstream further comprises a second plurality of macroblocks corresponding to a second slice of the video, wherein the second slice is an I-slice, and wherein, in response to the second slice being an I-slice, the first processor is configured to perform slice header parsing and entropy decoding for the second slice, the second processor is configured to perform inter prediction or intra prediction, inverse quantization, and inverse transformation for the second slice, the third processor is configured to perform deblock filter strength calculations for the second slice, and a fourth processor of said multi-core processor is configured to perform deblock filtering for the second slice.

5. The decoder apparatus according to claim 1,
wherein the plurality of macroblocks correspond to a low filter loading situation, wherein, in response to the low filter loading situation, the first processor is configured to perform slice header parsing and entropy decoding for the plurality of macroblocks, the second processor is configured to perform inter prediction or intra prediction, inverse quantization, and inverse transformation for the plurality of macroblocks, and the third processor is configured to perform deblock filter strength calculations, luma deblock filtering, and chroma deblock filtering for the plurality of macroblocks,
wherein the bitstream further comprises a second plurality of macroblocks corresponding to a moderate filter loading situation, wherein, in response to the moderate filter loading situation, the first processor is configured to perform slice header parsing and entropy decoding for the second plurality of macroblocks, the second processor is configured to perform inter prediction or intra prediction, inverse quantization, and inverse transformation for the second plurality of macroblocks, the third processor is configured to perform deblock filter strength calculations for the second plurality of macroblocks, a fourth processor of said multi-core processor is configured to perform luma deblock filtering and chroma deblock filtering for the second plurality of macroblocks, wherein the bitstream further comprises a third plurality of macroblocks corresponding to a high filter loading situation, wherein, in response to the high filter loading situation, the first processor is configured to perform slice header parsing and entropy decoding for the third plurality of macroblocks, the second processor is configured to perform inter prediction or intra prediction, inverse quantization, and inverse transformation for the third plurality of macroblocks, the third processor is configured to perform deblock filter strength calculations for the third plurality of macroblocks, the fourth processor is configured to perform luma deblock filtering for the third plurality of macroblocks, and a fifth processor of said multi-core processor is configured to perform chroma deblock filtering for the third plurality of macroblocks.

6. The decoder apparatus according to claim 1, wherein said first processor is configured to operate on a fourth group of said macroblocks for a duration of a fourth time slot, said second processor is configured to operate on a fifth group of said macroblocks in parallel with said first processor operating on said fourth group during the fourth time slot and to continue to operate on the fifth group of said macroblocks during a fifth time slot, and said fourth group has fewer of said macroblocks than said fifth group.

7. The decoder apparatus according to claim 1, further comprising one or more additional cores of said multi-core processor configured to decode a slice in said bitstream, wherein said one or more additional cores are to decode said slice in parallel with said first processor, said second processor, and said third processor to decode another slice in said bitstream.

8. The decoder apparatus according to claim 1, further comprising a fourth processor of said multi-core processor operating as a slave to said third processor and configured to perform one or more fourth decoding operations in said decoding of said macroblocks, wherein said fourth decoding operations comprise at least one of a picture resolution resizing or a color conversion.

9. The decoder apparatus according to claim 1, wherein said apparatus is implemented as one integrated circuit.

10. A method for multi-core low latency video decoding comprising:
performing one or more first decoding operations in a decoding of a plurality of macroblocks of video in a bitstream using a first processor of a multi-core processor;
performing one or more second decoding operations in said decoding of said macroblocks using a second processor of said multi-core processor operating as a slave to said first processor; and
performing one or more third decoding operations in said decoding of said macroblocks using a third processor of said multi-core processor operating as a slave to said second processor, wherein the first, second, and third processors operate in parallel during a first time slot on a first macroblock, a second macroblock, and a third macroblock of said macroblocks, respectively, wherein the second macroblock was previously operated on by the first processor in a second time slot prior to the first time slot, and the third macroblock was previously operated on by the first processor in a third time slot prior to the second time slot and by the second processor in the second time slot.

11. The method according to claim 10, wherein the first decoding operations comprise slice header parsing and entropy decoding, the second decoding operations comprise one of inter prediction or intra prediction, inverse quantization, and inverse transformation, and the third decoding operations comprise deblock filtering.

12. The method according to claim 10, wherein the plurality of macroblocks correspond to a first slice of the video, wherein the first slice is a P- or B-slice, wherein, in response to the first slice being a P- or B-slice, the first processor performs slice header parsing and entropy decoding for the first slice, the second processor performs inter prediction or intra prediction, inverse quantization, and inverse transformation for the first slice, and the third processor performs deblock filter strength calculations and deblock filtering for the first slice, wherein the bitstream further comprises a second plurality of macroblocks corresponding to a second slice of the video, wherein the second slice is an I-slice, the method further comprising:
in response to the second slice being an I-slice, the first processor performing slice header parsing and entropy decoding for the second slice, the second processor performing inter prediction or intra prediction, inverse quantization, and inverse transformation for the second slice, the third processor performing deblock filter strength calculations for the second slice, and a fourth processor of said multi-core processor performing deblock filtering for the second slice.

13. The method according to claim 10, wherein the plurality of macroblocks correspond to a low filter loading situation, wherein, in response to the low filter loading situation, the first processor performs slice header parsing and entropy decoding for the plurality of macroblocks, the second processor performs inter prediction or intra prediction, inverse quantization, and inverse transformation for the plurality of macroblocks, and the third processor performs deblock filter strength calculations, luma deblock filtering, and chroma deblock filtering for the plurality of macroblocks, wherein the bitstream further comprises a second plurality of macroblocks corresponding to a moderate filter loading situation and a third plurality of macroblocks corresponding to a high filter loading situation, the method further comprising:
in response to the moderate filter loading situation, the first processor performing slice header parsing and entropy decoding for the second plurality of macroblocks, the second processor performing inter prediction or intra prediction, inverse quantization, and inverse transformation for the second plurality of macroblocks, the third processor performing deblock filter strength calculations for the second plurality of macroblocks, a fourth processor of said multi-core processor performing luma deblock filtering and chroma deblock filtering for the second plurality of macroblocks; and
in response to the high filter loading situation, the first processor performing slice header parsing and entropy decoding for the third plurality of macroblocks, the second processor performing inter prediction or intra prediction, inverse quantization, and inverse transformation for the third plurality of macroblocks, the third processor performing deblock filter strength calculations for the third plurality of macroblocks, the fourth processor performing luma deblock filtering for the third plurality of macroblocks, and a fifth processor of said multi-core processor performing chroma deblock filtering for the third plurality of macroblocks.

14. The method according to claim 10, wherein the second time slot is immediately prior to the first time slot and the third time slot is immediately prior to the second time slot.

15. The method according to claim 10, wherein said first processor operates on a fourth group of said macroblocks for a duration of a fourth time slot, said second processor operates on a fifth group of said macroblocks in parallel with said first processor operating on said fourth group during the fourth time slot and to continue to operate on the fifth group of said macroblocks during a fifth time slot, and said fourth group has fewer of said macroblocks than said fifth group.

16. The method according to claim 10, further comprising:
  decoding a slice in said bitstream using one or more additional cores of said multi-core processor, wherein said decoding of said slice is performed in parallel with decoding another slice in said bitstream using said first processor, said second processor and said third processor.

17. The method according to claim 10, further comprising the step of:
  performing one or more fourth decoding operations in said decoding of said macroblocks using a fourth processor of said multi-core processor operating as a slave to said third processor, wherein said fourth decoding operations comprise at least one of a picture resolution resizing or a color conversion.

18. An apparatus comprising:
  means for performing one or more first decoding operations in a decoding of a plurality of macroblocks of video in a bitstream;
  means for performing one or more second decoding operations in said decoding of said macroblocks, said means for performing said second operations operating as a slave to said means for performing said first operations; and
  means for performing one or more third decoding operations in said decoding of said macroblocks, said means for performing said third operations operating as a slave to said means for performing said second operations, wherein the means for performing one or more first decoding operations, means for performing one or more second decoding operations, and means for performing one or more third decoding operations are to operate in parallel during a first time slot on a first macroblock, a second macroblock, and a third macroblock of said macroblocks, respectively, wherein the second macroblock was previously operated on by the means for performing one or more first decoding operations in a second time slot prior to the first time slot, and the third macroblock was previously operated on by the means for performing one or more first decoding operations in a third time slot prior to the second time slot and by the means for performing one or more second decoding operations in the second time slot.

19. The apparatus of claim 18, wherein the first decoding operations comprise slice header parsing and entropy decoding, the second decoding operations comprise one of inter prediction or intra prediction, inverse quantization, and inverse transformation, and the third decoding operations comprise deblock filtering.

20. The apparatus of claim 18, wherein the plurality of macroblocks correspond to a first slice of the video, wherein the first slice is a P- or B-slice, wherein, in response to the first slice being a P- or B-slice, the means for performing one or more first decoding operations perform slice header parsing and entropy decoding for the first slice, the means for performing one or more second decoding operations perform inter prediction or intra prediction, inverse quantization, and inverse transformation for the first slice, and the means for performing one or more third decoding operations perform deblock filter strength calculations and deblock filtering for the first slice, wherein the bitstream further comprises a second plurality of macroblocks corresponding to a second slice of the video, wherein the second slice is an I-slice, and wherein, in response to the second slice being an I-slice, the means for performing one or more first decoding operations perform slice header parsing and entropy decoding for the second slice, the means for performing one or more second decoding operations perform inter prediction or intra prediction, inverse quantization, and inverse transformation for the second slice, the means for performing one or more third decoding operations perform deblock filter strength calculations for the second slice, and means for performing one or more fourth decoding operations perform deblock filtering for the second slice.

* * * * *